Figure 1:
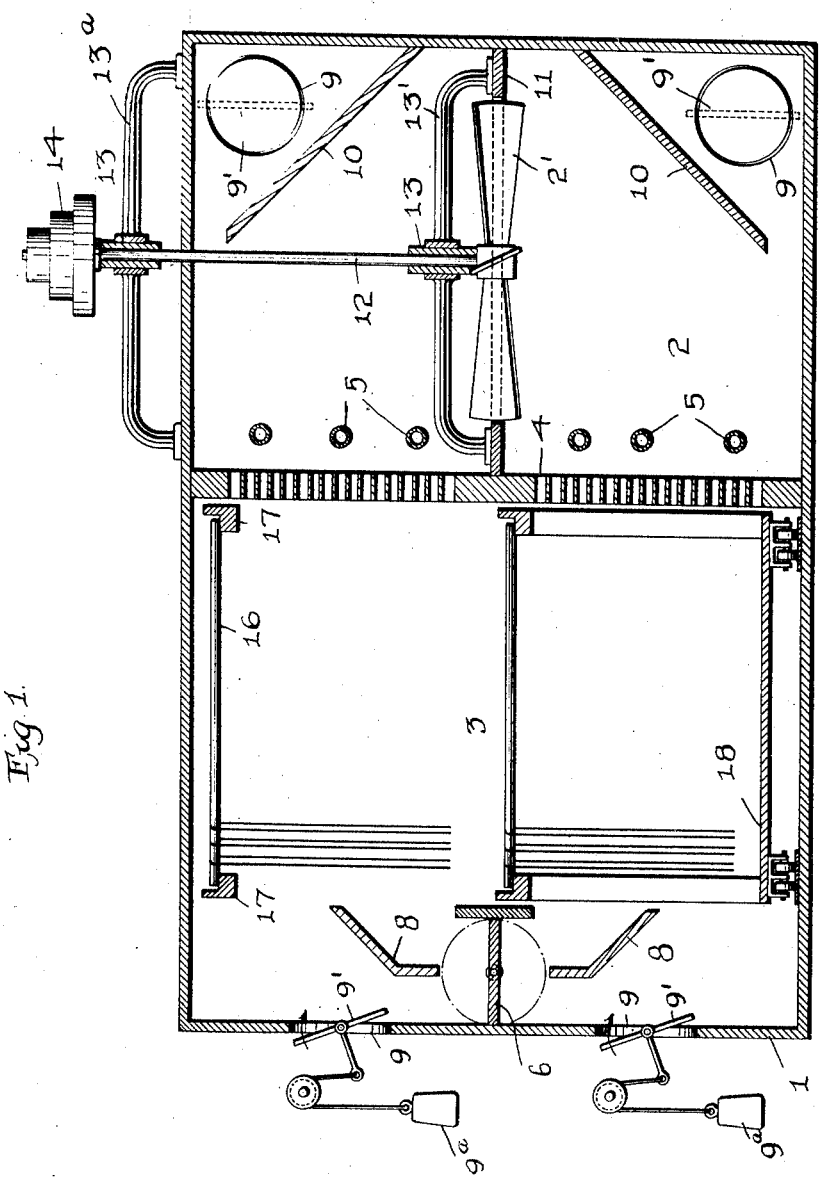

K. GAMMEL.
PROCESS OF DRYING MACARONI AND OTHER EDIBLE PASTES.
APPLICATION FILED NOV. 5, 1917.

1,349,568.

Patented Aug. 17, 1920.
2 SHEETS—SHEET 1.

Inventor
Karl Gammel
By his Attorneys
Mortimer Austin.

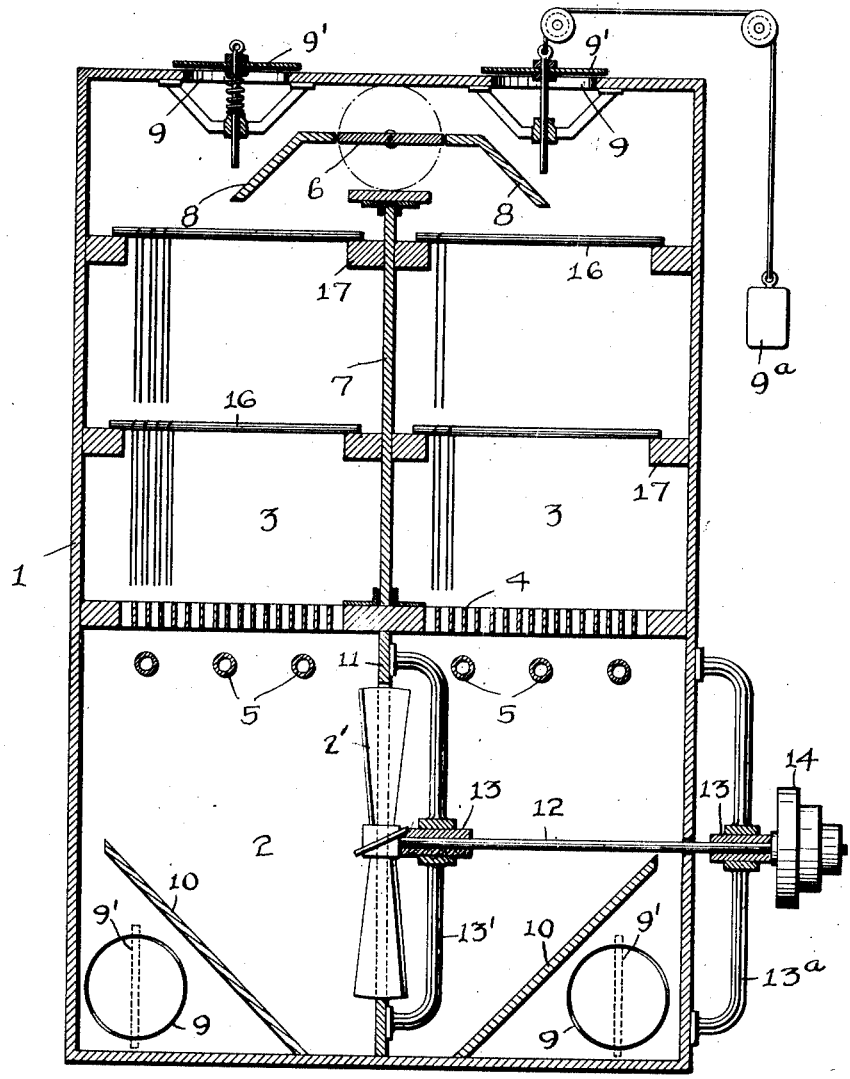

UNITED STATES PATENT OFFICE.

KARL GAMMEL, OF CLEVELAND, OHIO.

PROCESS OF DRYING MACARONI AND OTHER EDIBLE PASTES.

1,349,568.	Specification of Letters Patent.	Patented Aug. 17, 1920.

Application filed November 5, 1917. Serial No. 200,305.

*To all whom it may concern:*

Be it known that I, KARL GAMMEL, a citizen of the United States, and resident of Cleveland, in the county of Cuyahoga and State of Ohio, have invented certain new and useful Improvements in Processes of Drying Macaroni and other Edibles Pastes, of which the following is a specification.

My invention relates broadly to an apparatus for drying edible paste such as macaroni, spaghetti, short cut and similar products and relates particularly to an improved process for drying such paste in a drying chamber in order to shorten the time usually required under normal atmospheric conditions.

In the accompanying drawings:

Figure 1 is a side elevation partly in section, of an apparatus for carrying out my improved process; and Fig. 2 is a similar view showing a different arrangement of the apparatus.

Referring to the accompanying drawings the apparatus therein shown is more fully set forth and described at length in my Patent No. 1,246,812, granted November 13, 1917, and comprises essentially a rectangular casing 1 having a fan compartment 2 at one end, which communicates with two or more drying chambers 3 which occupy the main portion of the casing. A baffle plate 4 may be arranged between the fan compartment and the drying compartment, and if desired, heating pipes 5 may be placed in the fan chamber at any convenient location in the path of the air current created by the fan. At the end of the drying compartment opposite the fan, a valve 6 is positioned approximately in line with the partition 7 which divides the drying chamber into two compartments. This valve controls the passageway at the end of the drying chamber and therefore provides means for regulating the force of the draft therethough. The partition 7 is detachably mounted in the casing and when removed the closure of the valve will force the air current through one chamber or portion directly into the other chamber or portion of the drying compartment without necessarily traveling lengthwise of each separate chamber as it must do when the partition is in place and the valve is open. Deflecting plates 8 may be arranged in the end passage of the drying chamber to be in line with the valve in its open position which serves to distribute the air current around the drying chambers. Air openings 9 are provided both for the drying compartment and for the fan compartments. In the former an air opening is arranged opposite each of the chambers. The valves 9' for the air openings may be controlled in any suitable manner; for example, by the weights 9ª. The air inlets in the fan compartment are arranged on opposite sides of the fan and preferably these air inlets are placed behind suitable baffle plates 10 which also serve the purpose of deflecting the air current.

The fan 2' is mounted centrally of the fan compartment and occupies approximately the full width of an opening in a wall or partition 11.

The fan shaft 12 is mounted in bearings 13 in a bracket 13' which is fastened to the partition 11 and the other fastened on the outside of the casing in a bracket 13ª. The fan is rotated by means of a step pulley 14 driven from any suitable source of power by a belt (not shown).

The goods to be dried are supported in the drying chamber in any suitable manner. For example, the goods may be placed upon sticks 16 which rest upon supports 17 fastened to the casing or may be placed upon a traveling rack 18.

In carrying out my improved process, the goods are brought from the press until one or both of the drying chambers are filled. The goods are then subjected to a vigorous air current to carry off within a short time, as much of the excess moisture in the goods as possible. To accomplish this, the belt is shifted onto the smallest pulley and the fan is rotated at a relatively high speed and all of the air vents are opened, to their fullest extent. After this preliminary drying which is continued until the goods begin to show signs of bending or becoming brittle, the goods are subjected to a slower and less vigorous air current by reducing the speed of the fan and partially or entirely closing the air vents. In this manner practically the same air, with only small additions, is caused to circulate around and through the goods and the humidity of this air current rises rapidly, thus restoring the moist condition on the surface of the goods permitting the goods to straighten if they have become bent and become flexible if they have become brittle. Simultaneously the moisture on the interior of the goods has been drawn to the surface. As soon as a normal balance of moisture between the interior and exterior of the goods has been restored the air vents are opened and in certain classes of goods the speed of rotation of the fan is again increased to a maximum and the goods are subjected to the rapid drying effect of a vigorous air current having a considerable percentage of fresh and relatively dry air. This second vigorous drying is of shorter duration than the first, however, as the total moisture in the goods has already been reduced considerably and the surface of the goods becomes dry and the goods tend to bend more quickly. As soon as this condition reappears the air vents are again closed and the goods are subjected again to an air current of relatively high humidity caused by closing the vents and rotating the fan at a slower speed. For a considerable period of time thereafter, varying from four to eight hours, the fan is rotated at its second or intermediate speed and the air vents are operated to eject a quantity of moist air and admit a corresponding quantity of fresh air of lower humidity. By properly regulating the valves the quantity of moisture is gradually reduced without causing the goods to bend or to buckle or to split.

After the above mentioned period, the goods are subjected to a still slower air current in order to remove the remaining moisture without injury to the goods. This slower air current is produced by rotating the fan at a still slower or its lowest speed which rate of rotation is maintained until the drying process is practically completed which may vary from twelve to twenty-four hours. During this period also the air vents are regulated to control the humidity of the air, a sufficient amount of fresh air being admitted either continuously or at intervals to cause the humidity to decrease slowly and uniformly.

Artificial heating may be employed during the process to assist in controlling the humidity by raising the temperature in the drying compartment from time to time. In this way the period of the drying operation may be reduced considerably. Also the heating apparatus compensates for changes in the outside temperature and the heat is necessary in cold weather in order to obtain speedy results.

When the movable partition is removed the drying chambers become a single drying compartment and the air passes in at one side and then return to the fan through the goods. In this case the valve at the end of the casing opposite the fan may be closed. Preferably the valve is closed during the intermediate and later stages of the drying when a short circuit for the air current and therefore a greater volume of air within a given period, is desirable. During the early stages of drying, however, the valve may be left open as the baffle plate insures a thorough distribution of the air current throughout the entire casing. With the partition in place it is evident that one or both of the chambers may be filled with goods to be dried. When one chamber only is filled then the other chambers serves merely as an air passage, and if only the chamber adjacent the suction end of the fan is filled with goods then it will be evident that the air is withdrawn from around the goods in this chamber under a normal or slightly negative pressure. On the other hand, if the chamber adjacent the discharge end of the fan is filled with goods the air is forced through such chamber under a slightly increased pressure. Theoretically, the goods at one end of each compartment will dry at a slightly different rate from the goods at the opposite end of said compartment but in practice and owing to the close proximity of the goods and the relatively large quantity of goods compared to the air volume, the drying proceeds at a uniform rate in each compartment.

While I have shown and described and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. The process of drying macaroni which consists in subjecting the same to an air current of a relatively high velocity at normal atmospheric humidity, then decreasing the velocity of the air current and increasing its humidity, again increasing the velocity of the air current and subsequently decreasing the velocity of the air current and lowering its humidity to atmospheric conditions.

2. The process of drying macaroni which consists in removing the excess moisture by an air current having a relatively high velocity and relatively low humidity, then raising the humidity, and then lowering the velocity of the air current and gradually decreasing the humidity.

Signed at Cleveland in the county of Cuyahoga and State of Ohio this 31 day of October A. D. 1917.

KARL GAMMEL.

Witnesses:
J. K. SANTIMAN,
W. A. SANTIMAN.